US008095228B2

(12) United States Patent
Tajiri

(10) Patent No.: US 8,095,228 B2
(45) Date of Patent: Jan. 10, 2012

(54) DATA DISTRIBUTION APPARATUS, ITS CONTROL METHOD, PROGRAM, AND STORAGE MEDIUM

(75) Inventor: Katsutoshi Tajiri, Soka (JP)

(73) Assignee: Canon Kabushiki Kaisha, Tokyo (JP)

( * ) Notice: Subject to any disclaimer, the term of this patent is extended or adjusted under 35 U.S.C. 154(b) by 1585 days.

(21) Appl. No.: 11/139,347

(22) Filed: May 26, 2005

(65) Prior Publication Data

US 2005/0278166 A1 Dec. 15, 2005

(30) Foreign Application Priority Data

May 27, 2004 (JP) ................................. 2004-158027
Nov. 8, 2004 (JP) ................................. 2004-324079

(51) Int. Cl.
*G06F 17/00* (2006.01)
*G06F 15/16* (2006.01)
*H04L 12/16* (2006.01)

(52) U.S. Cl. ........................... 700/94; 370/270; 709/204

(58) Field of Classification Search .................... 700/94; 370/235.1, 237, 230.1, 270, 260, 261, 263, 370/390, 230, 231, 235, 352–356, 468, 535, 370/458, 544; 379/221.07, 101.01, 201.1; 709/203, 204, 205, 206, 207, 232, 233, 234, 709/235, 252; 348/14.08, 14.09, 14.1, 14.12
See application file for complete search history.

(56) References Cited

U.S. PATENT DOCUMENTS

| | | | | |
|---|---|---|---|---|
| 5,596,578 A | * | 1/1997 | Cunningham | 370/364 |
| 5,719,786 A | * | 2/1998 | Nelson et al. | 709/219 |
| 6,101,180 A | * | 8/2000 | Donahue et al. | 370/352 |
| 6,353,596 B1 | * | 3/2002 | Grossglauser et al. | 370/256 |
| 7,266,091 B2 | * | 9/2007 | Singh et al. | 370/260 |
| 7,349,352 B2 | * | 3/2008 | Vandermersch | 370/261 |
| 7,460,495 B2 | * | 12/2008 | Li | 370/267 |
| 2002/0143951 A1 | * | 10/2002 | Khan et al. | 709/227 |
| 2004/0215799 A1 | * | 10/2004 | Lehmann et al. | 709/230 |
| 2005/0213557 A1 | * | 9/2005 | Hwang et al. | 370/351 |
| 2005/0259584 A1 | * | 11/2005 | Chen et al. | 370/238 |
| 2006/0007930 A1 | * | 1/2006 | Dorenbosch | 370/390 |

FOREIGN PATENT DOCUMENTS

| | | |
|---|---|---|
| JP | 11-041257 A | 2/1999 |
| JP | 2002-223425 | 8/2002 |
| JP | 2003-281014 A | 10/2003 |

OTHER PUBLICATIONS

English Abstract of Japanese Patent No. 2002-223425.
The above references were cited in a Aug. 21, 2009 Japanese Office Action that Issued in Japanese Patent Application No. 2004-158027, which is enclosed without English Translation.

* cited by examiner

*Primary Examiner* — Davetta W Goins
*Assistant Examiner* — Daniel Sellers
(74) *Attorney, Agent, or Firm* — Cowan, Liebowitz & Latman, P.C.

(57) ABSTRACT

This invention has as its object to be able to maintain constant audio data transmission intervals even when video and audio data are transmitted to many users. A group number is assigned to each user, and every time data is generated, it is stored in buffers having different start positions. When a predetermined number of data can be stored, a transmission process to clients is executed. Hence, the load on the transmission processes can be distributed to the number of groups, and the difference of the transmission intervals of audio data can be minimized.

11 Claims, 11 Drawing Sheets

Prior Art

Prior Art

DATA DISTRIBUTION APPARATUS, ITS CONTROL METHOD, PROGRAM, AND STORAGE MEDIUM

FIELD OF THE INVENTION

The present invention relates to a technique for transmitting continuous data such as audio data, moving image data, and the like to many users via a network such as the Internet or the like.

BACKGROUND OF THE INVENTION

In recent years, distribution systems of data that require realtimeness such as a live image distribution system, video conference system, and the like which exploit an IP (Internet Protocol) network have been proposed.

In general, when many users access the live image distribution system or video conference system, video data suffer some frame drop and audio data suffer sound interruption in some cases. There are a few products that synchronize video and audio data, and in some systems, video and audio data go out of sync after a long time of use. Such problems are posed since video and audio data have different properties.

Video distribution represented by MotionJPEG or the like must transmit a large size of data in a short period of time. For this reason, when video data are distributed to many users while attaching an importance in realtimeness, all data cannot always be transmitted to all users, and the playback side suffers some frame drop upon playback. However, since the human eye can hardly perceive some frame drop of moving image data, such best-effort type transmission method is adopted.

Audio distribution represented by VoIP (Voice over IP) must transmit a smaller size of data than video data at constant intervals over a long period of time. Especially, when audio data are distributed to many users, if all data cannot be transmitted to all playback side clients at constant intervals, sound interruption or generation of undesirable noise such as an echo or the like occurs in some playback side clients.

In the prior art, the playback side client plays back audio data after it buffers the audio data to a given size in consideration of a delay or the like on the network. However, in live distribution that attaches an importance on realtimeness, data for several hundred msec to several sec can only be buffered, and the distribution server side must at least execute transmission processes at constant intervals.

An overview of the operation of the prior art upon distributing video and audio data to many users will be explained below.

A video/audio distribution server generally has a system configuration, as shown in FIG. 1. A distribution server 102 has a plurality of functional blocks.

A plurality of clients 109 transmit video and audio distribution requests to the distribution server 102 via a network 108. In the distribution server 102, a session manager 105 receives transmission requests from the clients via a network unit 107, and creates and saves client information 106. An audio data processor 103 and video data processor 104 respectively generate data to be transmitted, and issue data transmission requests to the network unit 107 via the session manager 105 with reference to the aforementioned client information 106. The network unit 107 delivers data to the clients as destinations in accordance with the transmission requests.

In case of distribution to many users, the audio data processor 103 and video data processor 104 execute processes for transmitting input data to all clients in accordance with the client information 106.

FIG. 2 shows the time relationship between the audio data generation timings and transmission processes when only audio distribution is made to many users in the prior art. In this example, assume that the number N of data to be transmitted at the same time is N=4.

Audio data 200, 201, . . . are generated in turn, and when fourth audio data 203 is generated, the audio data 200 to 203 begin to be transmitted together to all clients. Assume that the transmission completion timing of these data to all the client is the generation timing of audio data 205. In this case, transmission intervals 210 and 211 of the distribution processes to the clients are nearly equal to each other.

FIG. 3 shows all the transmission process timings of the video/audio distribution server when it executes a video distribution process simultaneously with the audio distribution process shown in FIG. 2.

The video and audio distribution processes can parallelly execute transmission processes by means of multi-task processes. However, since only one network unit 107 exists, as shown in FIG. 1, if the transmission process timings overlap, a longer transmission time is required. As can be understood from the example of FIG. 3, a transmission interval 310 is longer than the transmission interval 210 of only the audio distribution process in FIG. 2. On the other hand, since the audio distribution process has a small overlapping part with the video distribution process in a transmission interval 311, it suffers nearly no influence and can complete transmission processes while maintaining the same interval.

As described above, in the prior art, when video and audio distribution processes to many users are done, it is difficult to maintain constant audio transmission intervals. Especially, it becomes more difficult when the processing ability of the transmission apparatus is low.

SUMMARY OF THE INVENTION

The present invention has been made to solve the above situation, and has as its object to be able to maintain constant transmission intervals of audio data even when audio and video data are distributed to many users.

In order to solve the aforementioned problems and to achieve the above object, according to the first aspect of the present invention, a data distribution apparatus for dividing input data and transmitting the divided data to a plurality of destinations, is characterized by comprising a division device for dividing the plurality of destinations into a plurality of groups, and a transmission device for transmitting the divided data to the respective groups at different timings in accordance with generation of the division data.

According to the second aspect of the present invention, a method of controlling a data distribution apparatus for dividing input data and transmitting the divided data to a plurality of destinations, is characterized by comprising a division step of dividing the plurality of destinations into a plurality of groups, and a transmission step of transmitting the divided data to the respective groups at different timings in accordance with generation of the division data.

According to the third aspect of the present invention, a program is characterized by making a computer implement the control method.

According to the fourth aspect of the present invention, a storage medium is characterized by computer-readably storing the program.

DETAILED DESCRIPTION OF THE PREFERRED EMBODIMENTS

Preferred embodiments of the present invention will be described hereinafter with reference to the accompanying drawings.

Figure 4:
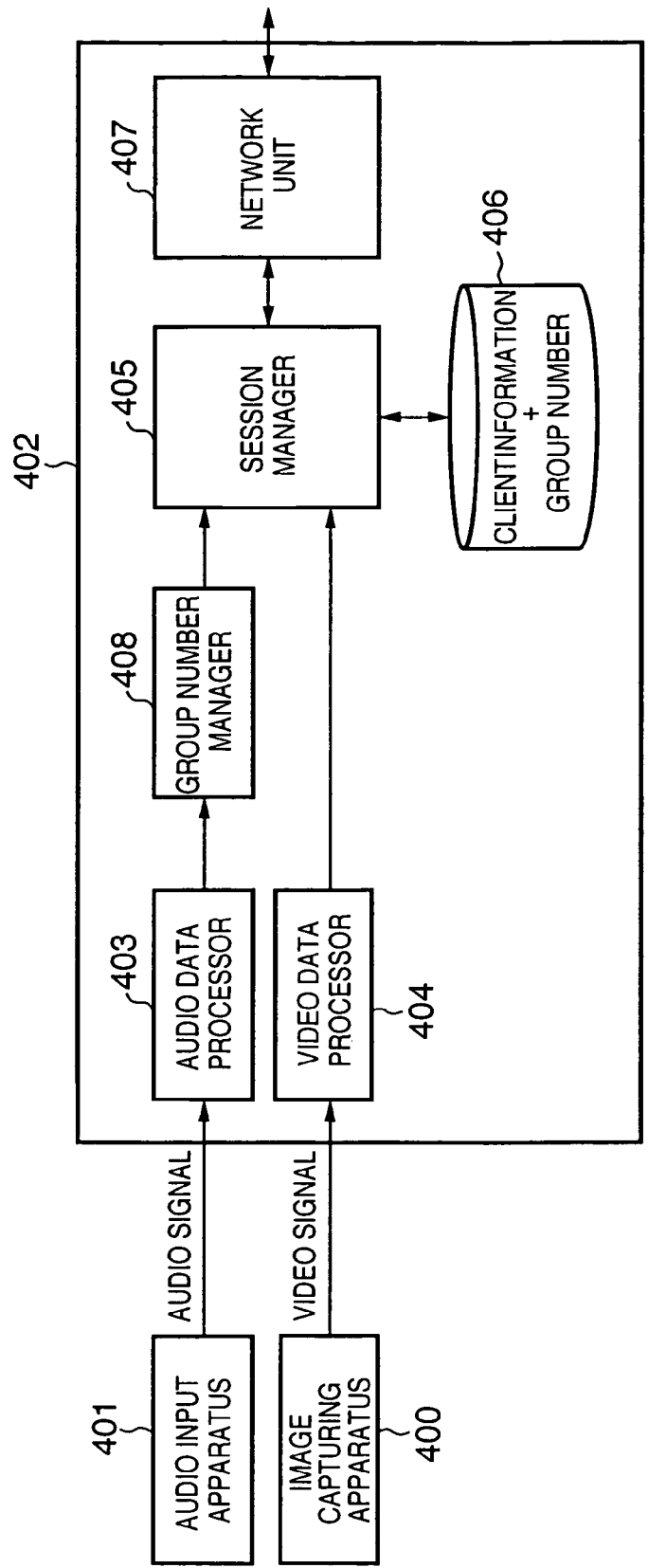
FIG. 4 is a functional block diagram of a video/audio distribution server according to an embodiment of the present invention.

FIG. 4 is a block diagram showing the system arrangement common to some embodiments of the present invention.

Figure 1:
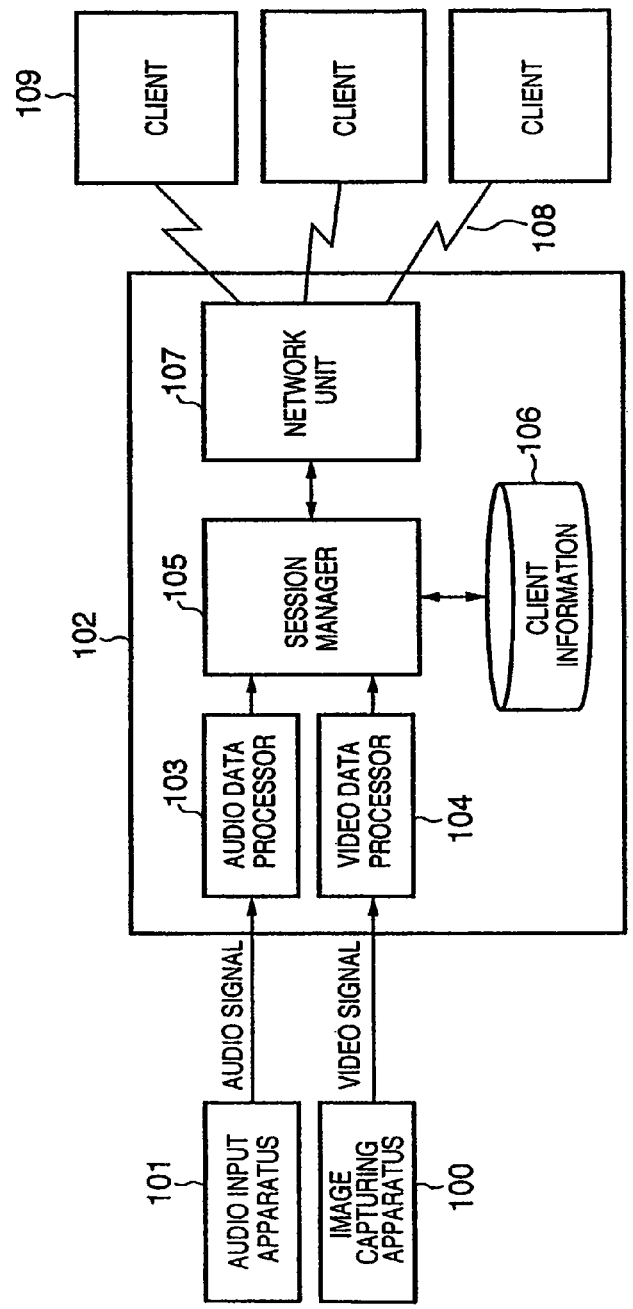
FIG. 1 is a functional block diagram showing the arrangement of a conventional video/audio distribution system and distribution server.

Referring to FIG. 4, reference numeral 400 denotes an image capturing apparatus; 401, an audio input apparatus; 402, a distribution server; 403, an audio data processor; 404, a video data processor; 405, a session manager; and 407, a network unit, which provide functions similar to those of an image capturing apparatus 100, audio input apparatus 101, distribution server 102, audio data processor 103, video data processor 104, session manager 105, and network unit 107 shown in FIG. 1.

In this embodiment, in addition to these blocks, an area for saving group numbers is assured on a storage unit which stores client information 406 to be referred to by the audio data processor 403 and video data processor 404. Also, the system further comprises a group number manager 408 which manages groups, buffer storage of which is complete, and for which group a transmission process is to be executed upon reception of the next audio data.

First Embodiment

Referring to FIG. 4, the session manager 405 assigns group numbers to clients in response to transmission requests from the clients, and creates and saves the client information 406.

In this embodiment, all clients that issued transmission requests are divided into four groups 1 to 4. As a method of assigning group numbers, the same numbers of clients belong to groups of respective group numbers upon connection.

The audio data processor 403 divides audio data input from the audio input apparatus 401, assigns serial numbers (discrimination marks) to divided audio data, and sends them to the group number manager 408. The group number manager 408 combines a predetermined number of audio data from audio data next to the already transmitted divided audio data with reference to the discrimination mark from a buffers which is managed for each group, and transmits them to a group as a destination via the network unit 407.

Figure 5:
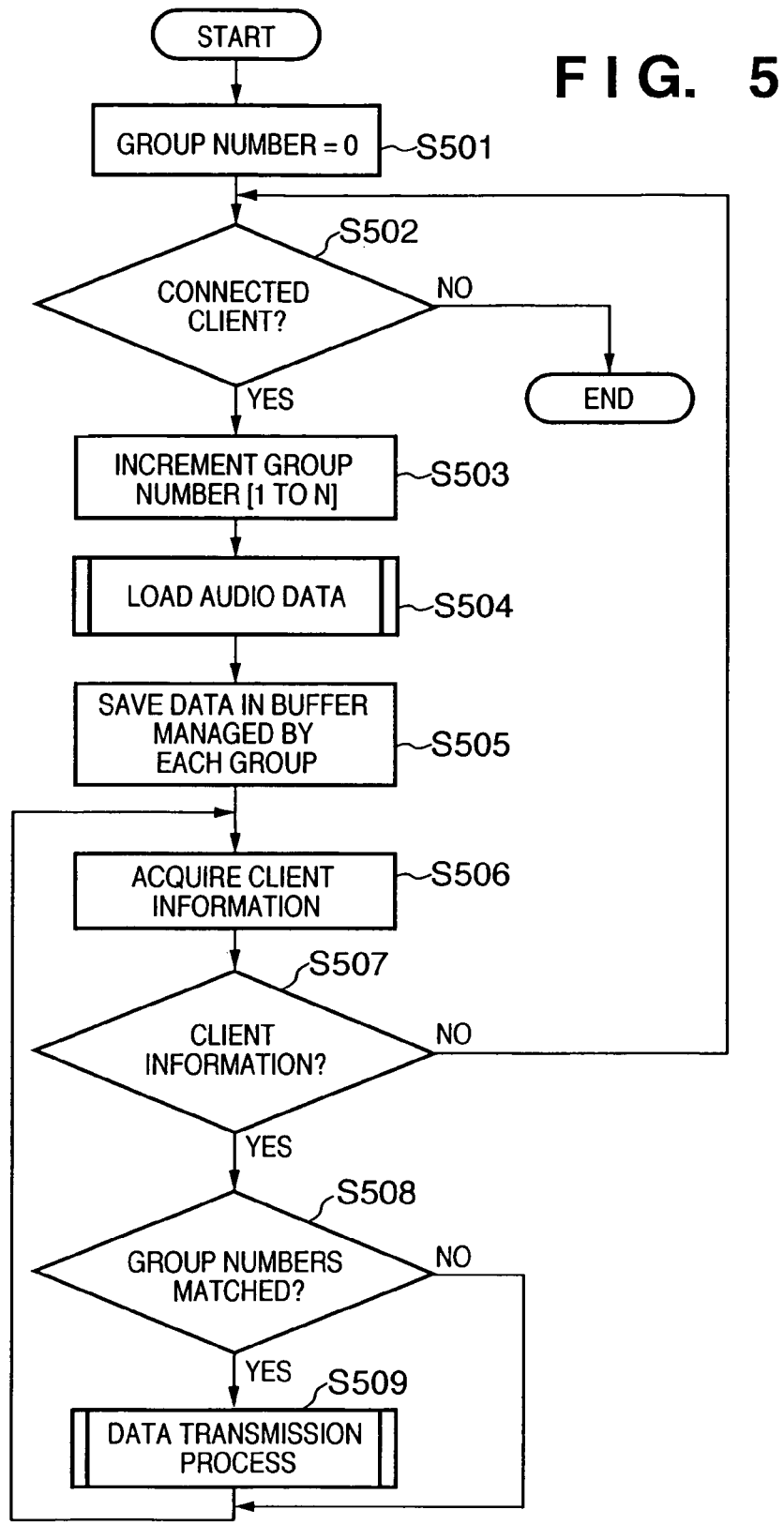
FIG. 5 is a flowchart showing the process to be executed by a group number manager.

The flow of the processing to be executed by the group number manager 208 will be described below with reference to the flowchart of FIG. 5.

The session manager 405 comprises a RAM for temporarily storing a readout program, and a CPU for executing the program. When the manager 405 creates and saves client information, it starts the group number manager 408.

The group number manager 408 sets a group number under operation to be zero (step S501).

The group number manager 408 checks with reference to the client information if connected clients are present (step S502). If no client is connected, the manager 408 ends its process.

If connected clients are present in step S502, the group number manager 408 increments the group number under operation so that the group number under operation increases in turn within the range of 1 to 4 (N=4 in this embodiment) (step S503).

The group number manager 408 divisionally loads input audio data every given size (step S504), and saves them in buffers managed for respective group numbers (step S505).

The group number manager 408 searches for client information (step S506) to check if the next client information is available (step S507). If the search process for all the clients under communication is complete, the flow returns to the process in step S502 to check if a new connected client is present. On the other hand, if the search process for all the clients under communication is not complete in step S507, the group number manager 408 checks if the group number in the currently found client information matches the group number under operation (step S508). If these numbers match, the group number manager 408 executes a transmission process of audio data stored in the buffer corresponding to the group number under operation (step S509); otherwise, it does nothing. Then, the flow returns to the client information search process (step S506).

Figure 6:
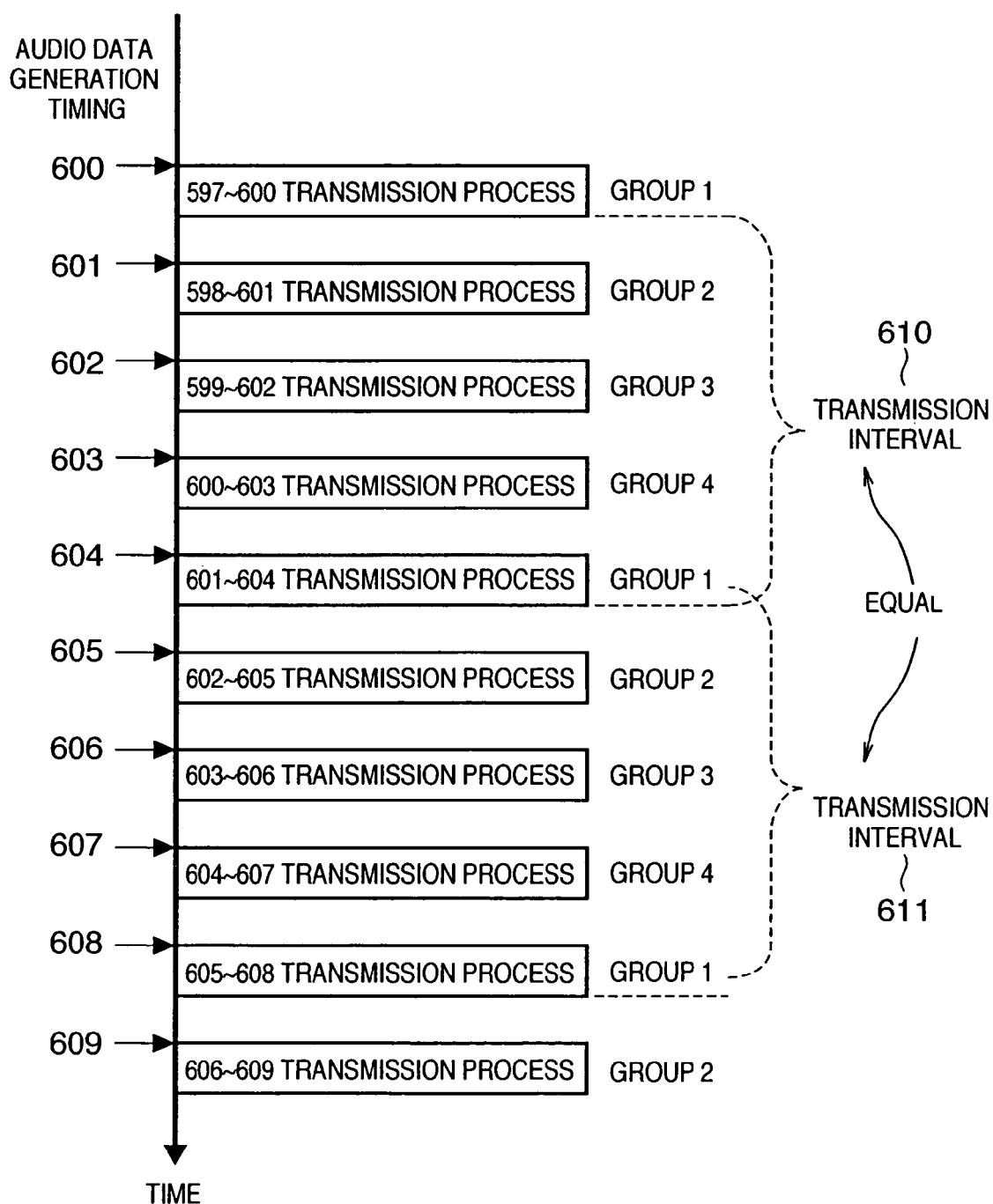
FIG. 6 is an operation timing chart when audio distribution to many users is made according to the first embodiment of the present invention.

FIG. 6 shows the time relationship between the audio data generation timings and transmission processes when only audio distribution to many users is made in this embodiment.

Figure 2:
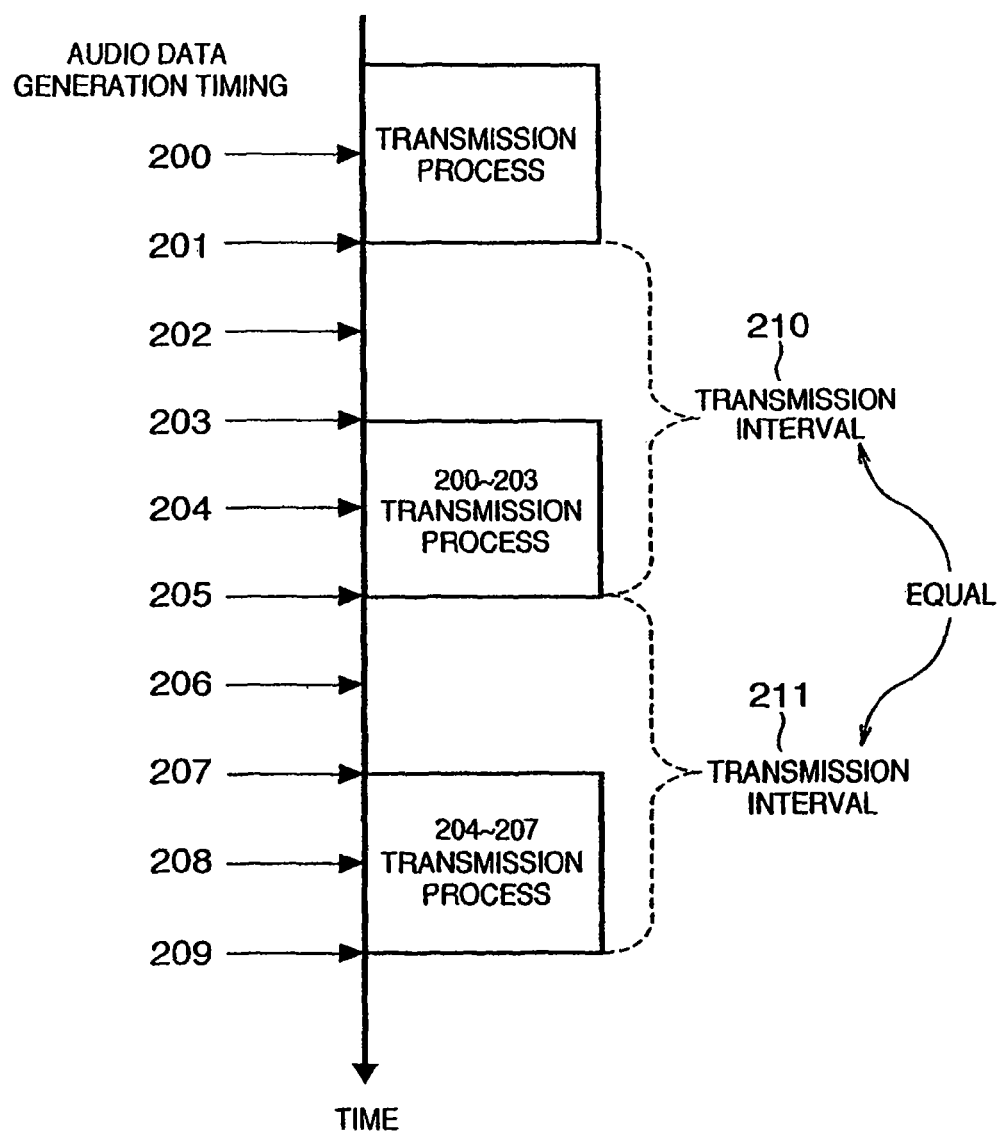
FIG. 2 is a timing chart showing the conventional operation timings when audio distribution to many users is made.
Figure 3:
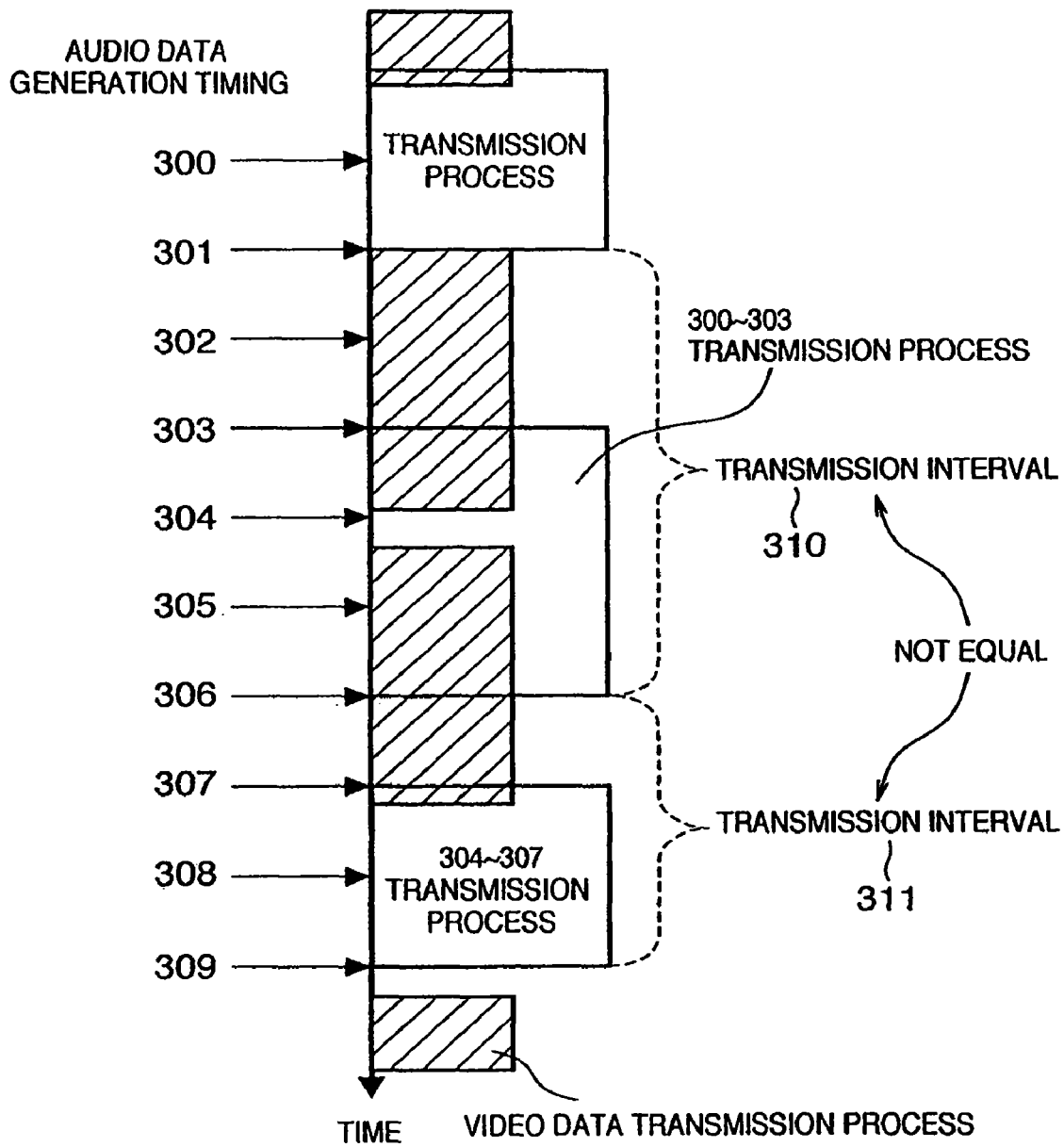
FIG. 3 is a timing chart showing the conventional operation timings when audio distribution and video distribution to many users are made.

Paying attention to the transmission interval of the last client of group 1, since only audio distribution is to be made, transmission intervals 610 and 611 are equal to each other (the transmission interval is the same as that in FIG. 2).

Figure 7:
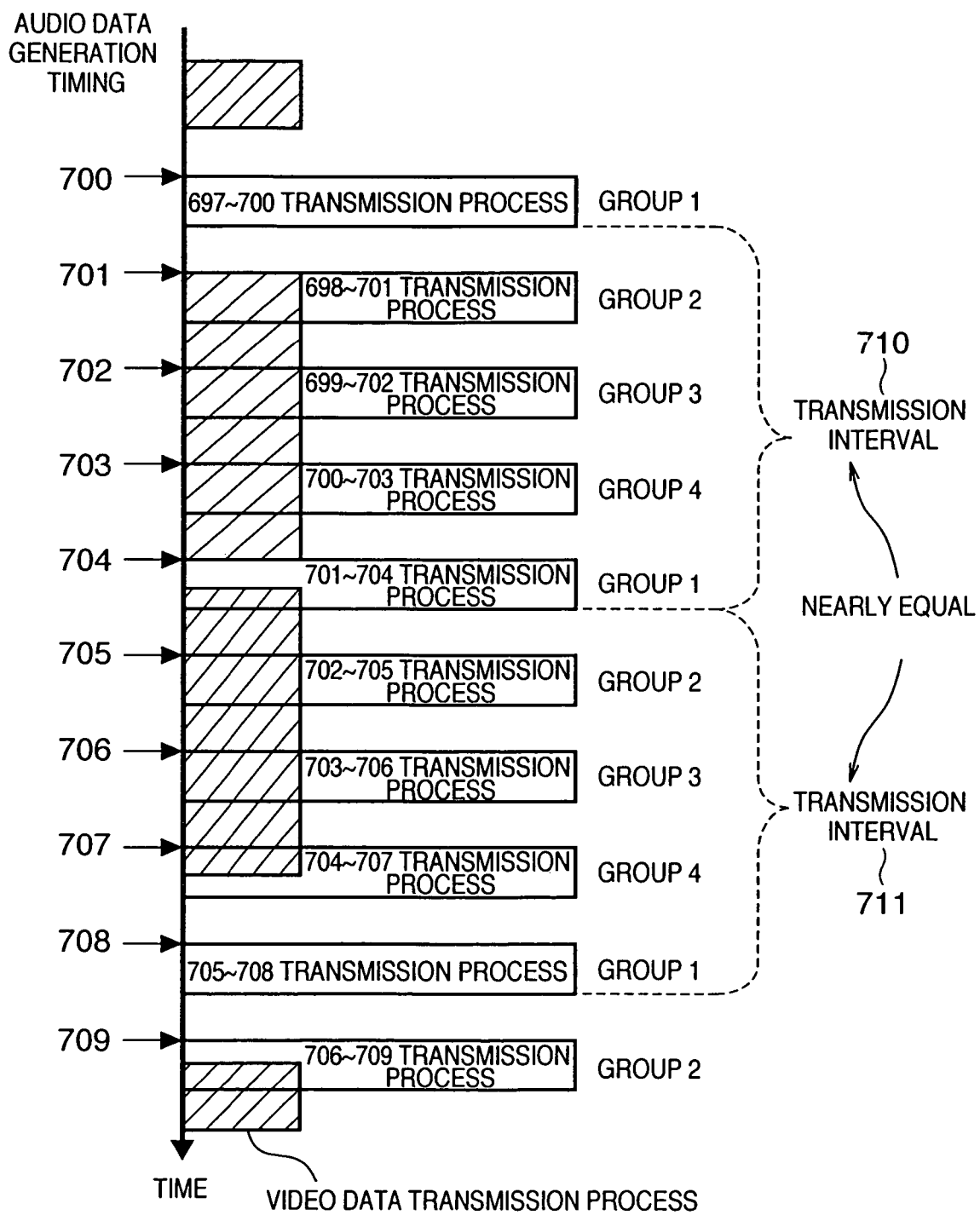
FIG. 7 is an operation timing chart when audio distribution and video distribution to many users are made according to the first embodiment of the present invention.

FIG. 7 shows all the transmission process timings when a video distribution process is done simultaneously with the audio distribution process in FIG. 6.

As can be seen from FIG. 7, when the video and audio distribution processes are executed at the same time, the audio transmission interval for a group with overlapping processing timings is slightly delayed, but the influence on other groups is suppressed, and transmission intervals 710 and 711 do not have a large difference as a whole.

In this manner, in the audio distribution process, since the transmission timings of identical divided audio data are shifted for respective groups, the load on the transmission processes can be distributed to the number of groups. For this reason, even when the audio transmission timing overlaps another processing timing of, e.g., video distribution, the difference of the transmission intervals of audio data and the influence on clients can be minimized.

From the perspective of each client, since data is output from the server when the data is stored in the buffer corresponding to the group to which that client belongs, the realtimeness is never lost.

Second Embodiment

When many users access video and audio distribution functions, the numbers of users who belong to groups of respective group numbers vary depending on disconnection timings even when even numbers of users are assigned to groups of respective group numbers. In order to minimize the difference of the transmission intervals, the number of users who belong to each group number is preferably reduced to distribute transmission processes.

To this end, according to this embodiment, groups are relocated not only at connection timings but also at client disconnection timings. This process will be explained using FIG. 8.

For example, three clients belong to group 1, and two clients belong to each of groups 2 to 4. If a client of group 4 is disconnected, the numbers of clients that belong to respective groups become 3, 2, 2, and 1. In terms of transmission process distribution, all the numbers of clients that belong to respective groups are preferably set to be two. For this reason, a case will be examined wherein a client of group 1 is moved to group 4.

In the operation of group 1, a transmission process is done after audio data 800 to 803 are stored. After that, the position of one client of group 1 is changed to group 4, and its client information saves that transmission is complete up to the audio data 803.

Figure 8:
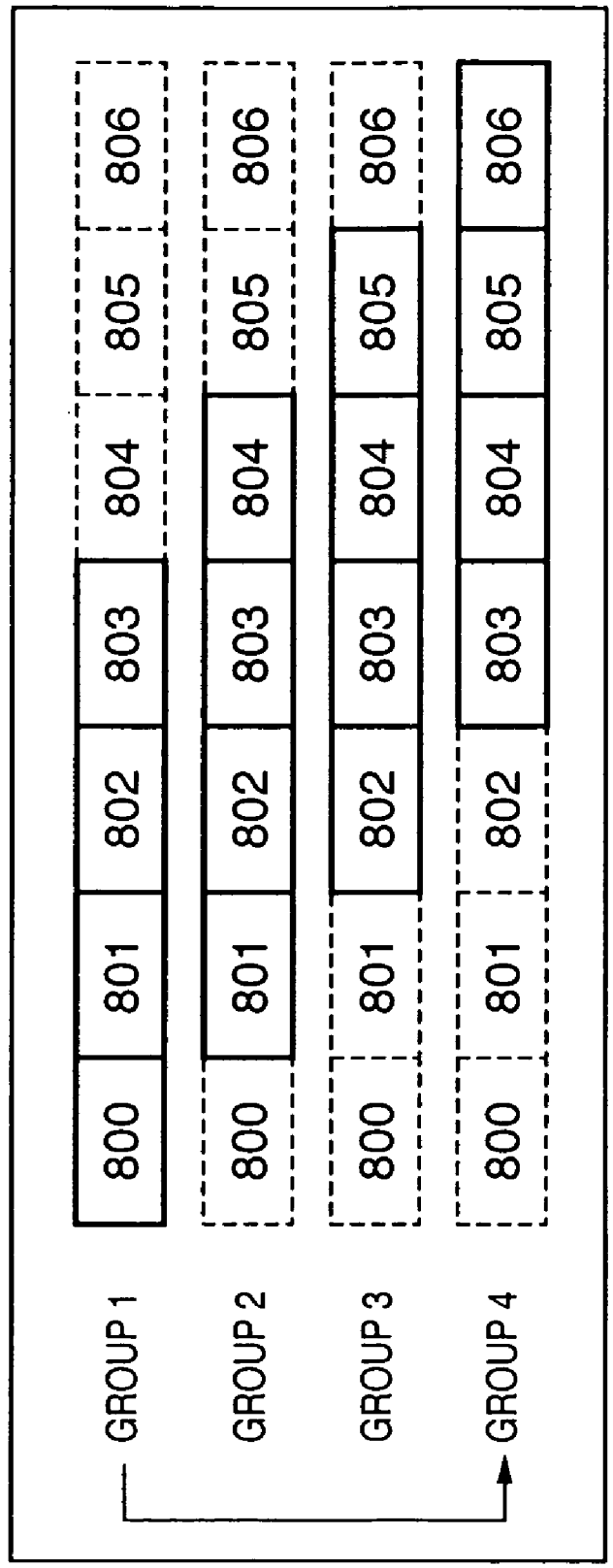
FIG. 8 is a transmission data transition chart due to inter-group movement of clients.

In the operation of group 4, as shown in FIG. 8, when audio data 806 is generated, a transmission process is executed again, and audio data 803 to 806 are transmitted. In this case, audio data 800 to 803 have already been transmitted to the client whose position is changed from group 1 to group 4, and the client information saves that transmission is complete up to the audio data 803. Hence, a total of three audio data, i.e., audio data 804 to 806 are transmitted to that client.

In this way, upon distribution to many users, since the groups are relocated depending on the client disconnection timings, the numbers of clients that belong to groups of respective group numbers can be equally distributed, and the difference of the transmission intervals can always be minimized.

Third Embodiment

In the description of the first embodiment, the number of groups=4, and the number of storage buffers=4. When the number of connected clients is small, four groups need not be prepared, and it is more likely that constant transmission intervals can be maintained using even three or less groups. It is very effective to reduce the number of groups since the resources such as the memory of the apparatus and the like can be efficiently used.

More specifically, when the number of clients to be connected is smaller than a predetermined value A, the number of groups is one; when the number of clients ranges from A to 2×A, the number of groups to be divided is two; . . . , when the number of clients ranges from (M−1)×A to M×A, the number of groups to be divided is M. The maximum value of M is the number of storage buffers.

Even when the number M of groups is set to be larger than the number of storage buffers, since the transmission timing overlaps another arbitrary group, it is nonsense to divide the number of groups exceeding the number M of storage buffers.

Due to an increase/decrease in number of groups, the group numbers to which clients belong change. However, since the move method of a client between group numbers can use that of the second embodiment, such problem can be solved.

In this manner, when the number of groups is changed in accordance with an increase/decrease in number of clients to be connected, the resources of the apparatus itself can be efficiently used.

As described above, according to the embodiments, upon reception of an audio distribution request from a client, a group number is assigned to each client, and every time data is generated, it is stored in buffers for groups which have different start positions. When a predetermined number of data can be stored, a transmission process to clients is executed. Hence, the load on the transmission processes can be distributed to the number of groups, and the difference of the transmission intervals of audio data can be minimized. When experiments were conducted by the video/audio distribution server in practice for the number of groups=4 and the number of storage buffers=4×10 ms, the difference of the transmission intervals fell within the range from ±5 ms to ±1 ms, thus obtaining a satisfactory result.

Since buffers having different start positions are used for respective groups, the storage completion timings of a predetermined number of data are different, and data can always be transmitted to clients at the generation timing of the latest data. Hence, the realtimeness is never lost.

According to the above embodiments, even when audio and video data are distributed to many users, the transmission intervals of audio data can be maintained constant.

When an audio distribution process or the like to many users is simultaneously made, the CPU load on the distribution server 402 side becomes high in practice.

When the following process is adopted in the aforementioned embodiment, control can be made to maintain constant data transmission intervals of data that require realtimeness.

Figure 9:
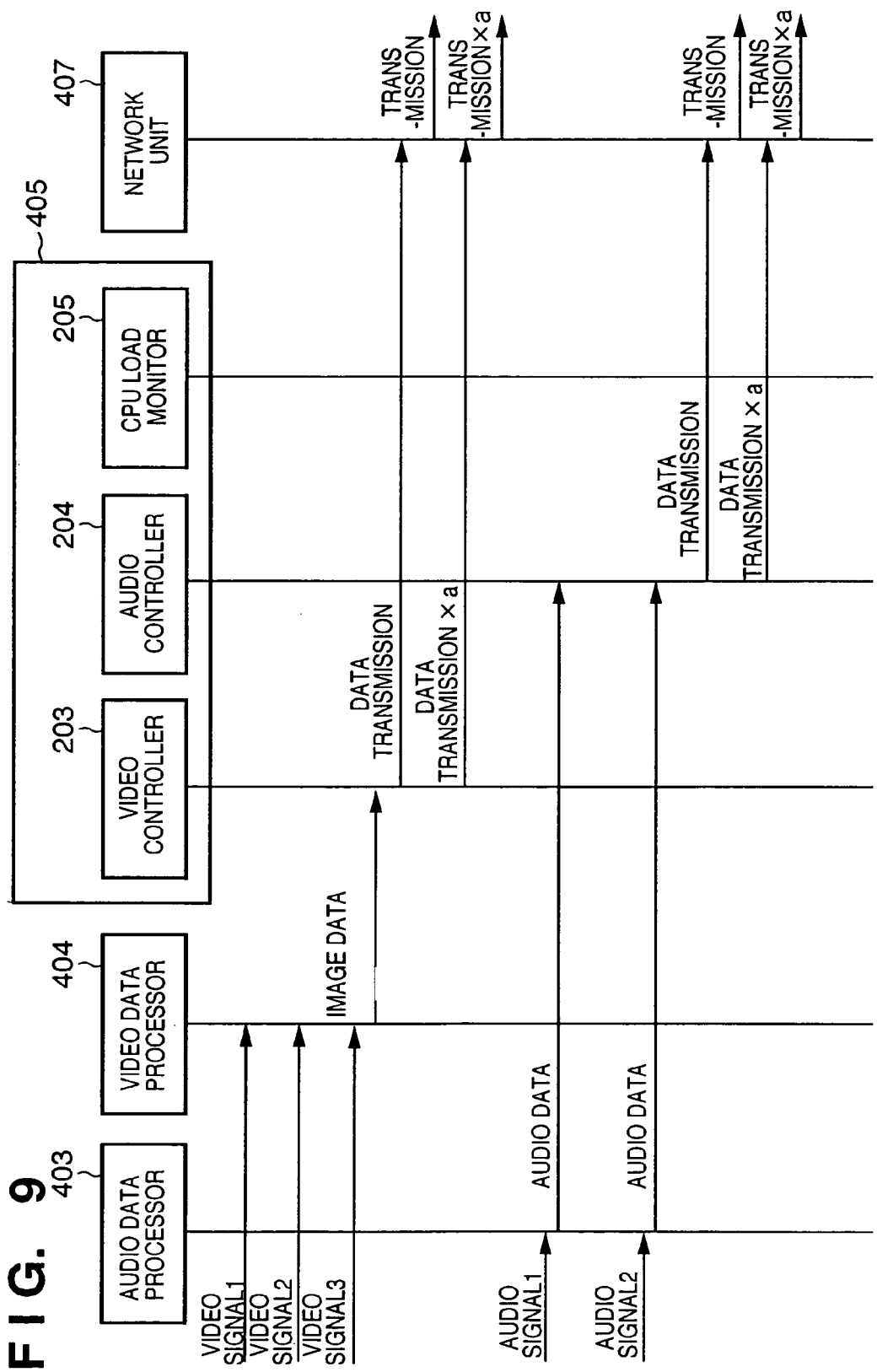
FIG. 9 shows a normal data distribution operation sequence of the distribution server.

The data distribution operation sequence of the distribution server 402 will be described below using FIG. 9. FIG. 9 shows the data distribution operation sequence of the distribution server 402.

In the distribution server 402, the session manager 405 includes three major functions: a video controller 203 as a function of controlling video distribution, an audio controller 204 as a function of controlling audio distribution, and a CPU load monitor 205 as a function of monitoring the CPU load. Assume that these three functions share and use the same CPU resources in the session manager 405.

Upon reception of distribution requests from the clients 109, the video and audio controllers 203 and 204 distribute video and audio data as follows.

As for video distribution, the video data processor 404 compresses an input video signal and generates image data. The video controller 203 requests the network unit 407 to execute image transmission. At this time, image data is transmitted to all clients as distribution request sources (a+1 clients or users in FIG. 9). The network unit 407 transmits data to the clients 109 as destinations in accordance with the transmission requests.

As for audio distribution, the audio data processor 403 compresses an input audio signal and generates audio data.

The audio controller 204 stores audio data up to the number N of data (N=2 in FIG. 9), which does not impair realtimeness, and requests the network unit 407 to simultaneously transmit N audio data to clients as distribution request sources.

At this time, audio data is transmitted to all clients as distribution request sources (a+1 clients or users in FIG. 9). The network unit 407 transmits data to the clients 109 as destinations in accordance with the transmission requests.

Figure 10:
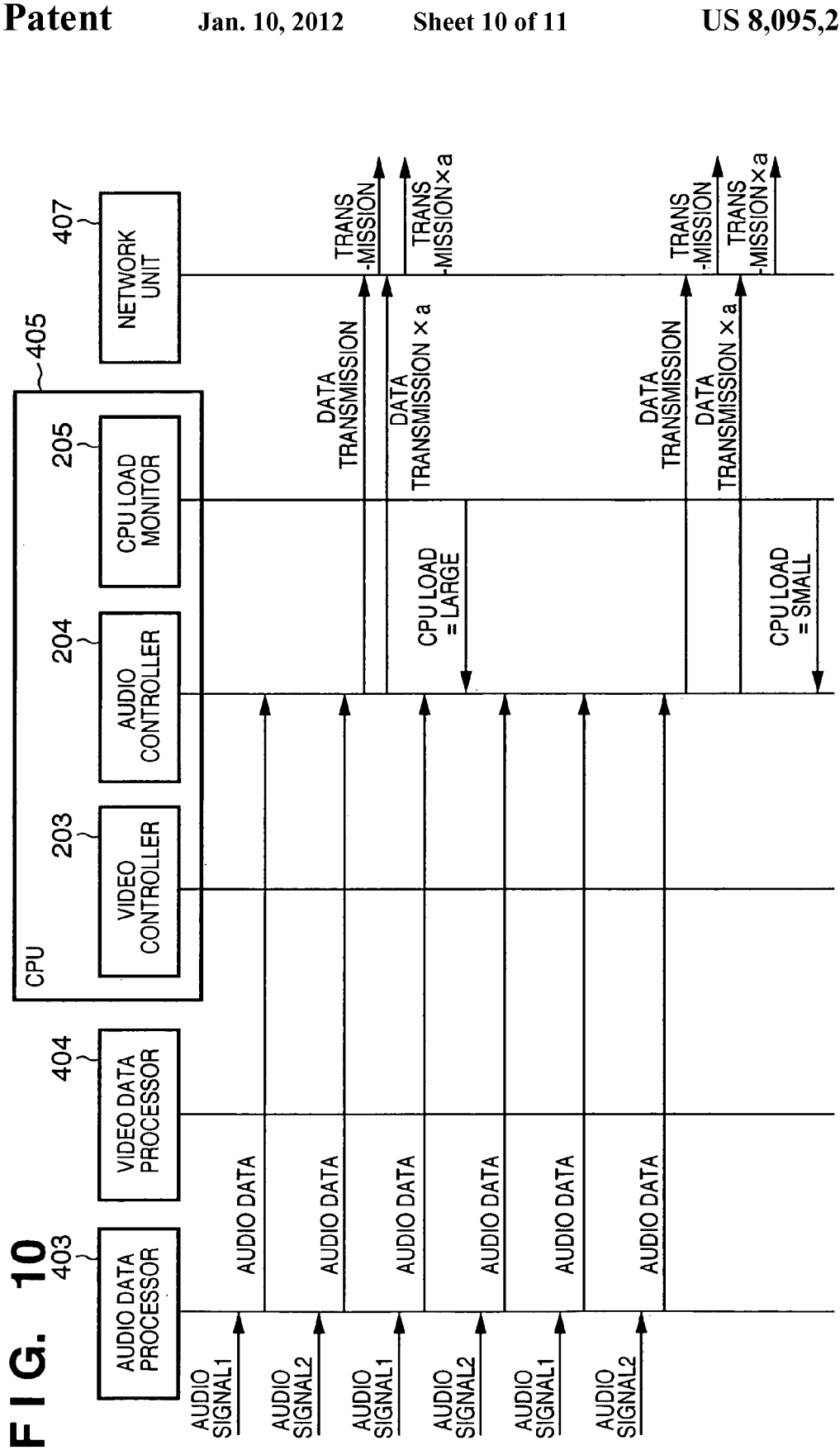
FIG. 10 shows an audio distribution operation sequence.

The audio distribution operation sequence as a characteristic feature of this embodiment will be explained below. FIG. 10 shows a normal audio distribution operation sequence.

The session manager 405 controls the aforementioned video and audio distribution processes. At the same time, the manager 405 always monitors the current level of the CPU load using the CPU load monitor 205.

Note that the CPU load can indicate that, for example, the load increases in proportion to the number of clients (or the number of users) connected to the distribution server 402, and can indicate that the CPU load is high when the number of clients exceeds a predetermined value or it is low when the number of clients is less than the predetermined value.

In the audio distribution operation sequence, when the number of connected clients exceeds a given threshold, the CPU load monitor 205 determines that the CPU load is high, and informs the audio controller 204 accordingly. Upon reception of the message indicating that the CPU load is high, the audio controller 204 increases the number of audio data to be transmitted at the same time. For example, the controller 204 changes the number of transmission data to M=N+n ($n \geq 1$, n=2 in FIG. 10), and inhibits the data transmission process until M data are stored.

Note that the number of transmission data is determined within the range of the capacity of the reception buffer on the client 109 side, which is acquired in advance as information and can absorb the number of transmission data. In this case, sound interruption of audio data received on the client 109 side can be prevented and the realtimeness can be never lost.

In this way, since the number of audio data to be simultaneously transmitted at the same time from the audio controller 204 to the network unit 407 is increased, the number of times of transmission from the network unit 407 to each client 109 can be reduced. This means that the CPU occupation time required for the process of the audio controller 204 is shortened, and the transmission interval difference due to a short CPU occupation time can be reduced.

The audio controller 204 executes data transmission every M transmission data until it receives, from the CPU load monitor 205, a message indicating that the CPU load is low. After reception of the message indicating that the CPU load is low from the CPU load monitor 205, the audio controller 204 executes data transmission every N data again.

Figure 11:
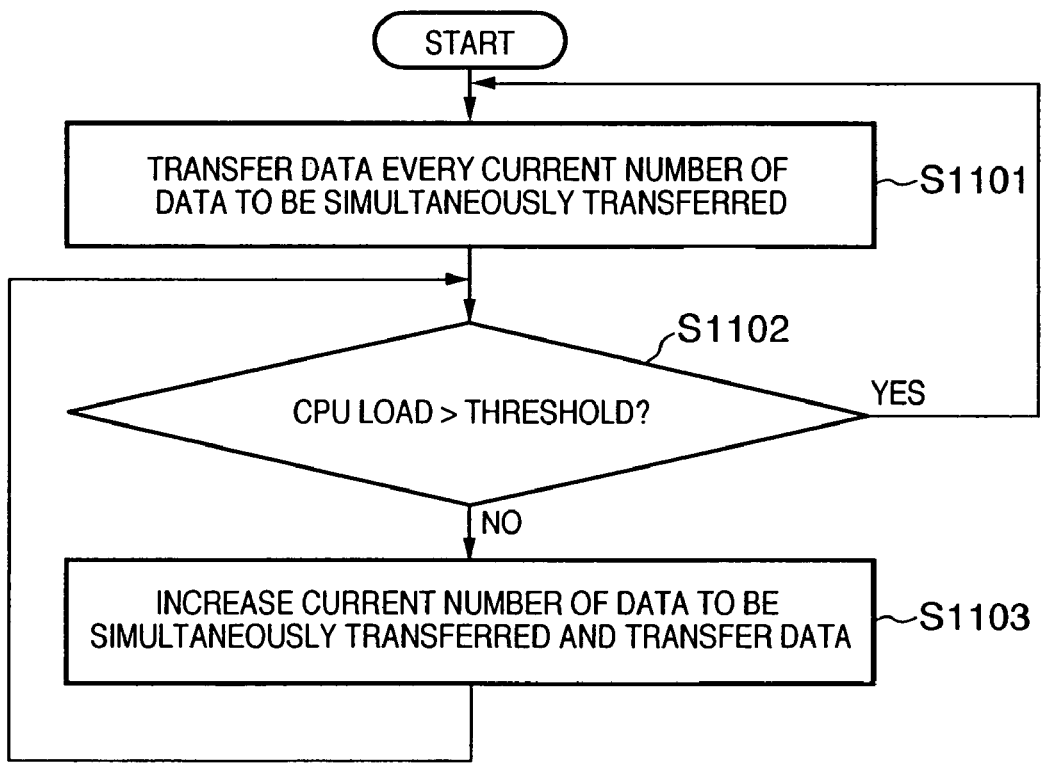
FIG. 11 is a flowchart showing an audio distribution operation.

The audio distribution operation will be described below using the flowchart of FIG. 11 which shows that operation.

In step S1101, the audio controller 204 distributes audio data received from the audio data processor 403 every predetermined number of data to be transferred at the same time to respective clients via the network unit 407.

It is checked in step S1102 on the basis of the monitoring result of the CPU load monitor 205 if the processing load (CPU load) of the distribution server 402 has exceeded a threshold. If the processing load has not exceeded the threshold (NO in step S1102), the flow returns to step S1101. On the other hand, if the processing load has exceeded the threshold (YES in step S1102), the current number of data to be transferred at the same time is increased, and audio data are distributed to respective clients via the network unit 407. After that, the flow returns to step S1102.

As described above, when the CPU load on the distribution server 402 becomes high, a transmission unit of audio data is increased, thus reducing the transmission interval difference, and eliminating sound interruption on the client 109 side.

That is, when the CPU load on the distribution server 402 has exceeded the predetermined threshold, the transmission unit of audio data is increased to reduce the number of transmission processes, thus minimizing transmission interval difference of audio data.

In the aforementioned process, a constant value is used as the threshold of the CPU load. When this threshold has been exceeded, a message indicating that the CPU load is high is output. However, a criterion used to determine if the CPU load is high, and that used to determine if the CPU load is low need not assume the same value. A first criterion (first threshold) used to determine if the CPU load is low is provided, and is set to be lower than a second criterion (second threshold) used to determine if the CPU load is high, thus preventing frequent changes of the transmission unit.

That is, when the identical criterion is used, if the CPU load repetitively increases/decreases around the threshold, the transmission unit of audio data is frequently changed between, e.g., N and M data within a short period of time. When this occurs, the transmission intervals do not become constant for each client 109, so that the reception buffer used to receive audio data causes underflow, and sound interruption is more likely to occur.

By contrast, when the different criteria are used, even when the CPU load repetitively increases/decreases around the threshold used to determine if it is high, the transmission unit can be prevented from being frequency changed between N and M data. That is, once the transmission unit has been changed, it is not so readily changed. Hence, for each client, the transmission intervals become constant soon, and the reception buffer is unlikely to cause underflow.

Only one threshold of the CPU load is used in the above example. However, the number of thresholds of the CPU load need not always be one. When a plurality of thresholds are set, instantaneous transmission interval errors when the transmission unit changes from N data to M data can be reduced.

For example, if the transmission unit is suddenly changed from 40 ms to 80 ms when the CPU load becomes 70% of a maximum load, the client 109 performs a process when a transmission error of 40 ms has occurred instantaneously. However, when the CPU load increases like 60%, 70%, 80%, and 90%, since the transmission unit is changed to 50 ms, 60 ms, 70 ms, and 80 ms, the instantaneous transmission error at the client can fall within 10 ms, thus reducing the possibility of overflow of the reception buffer.

That is, when the plurality of thresholds which increase stepwise are provided, and the transmission unit is changed (increased) stepwise, the instantaneous transmission error can be reduced.

Note that the processing load ratio measured by the function of the OS installed in the distribution server 402 may be monitored as the CPU load. For example, values of the ratios of the CPU load for respective internal processes of the apparatus may be calculated, and the sum of these ratios may be defined as the CPU load.

Other Embodiments

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores a program code corresponding to the aforementioned flowchart.

As many apparently widely different embodiments of the present invention can be made without departing from the spirit and scope thereof, it is to be understood that the invention is not limited to the specific embodiments thereof except as defined in the claims.

What is claimed is:

1. A data transmitting apparatus for transmitting audio data to a plurality of destinations, comprising:
   a grouping unit configured to group the plurality of destinations into a plurality of groups including at least a first group and a second group such that first and second destinations belong to the first group and third and fourth destinations belong to the second group; and
   a transmission processing unit configured to process for transmitting, at a first timing corresponding to generation of audio data of a first time period, the audio data of the first time period to the first destination of the first group, and to process for transmitting, at a second timing corresponding to generation of audio data of a second time period later than the first time period and overlapped with the first time period, the audio data of the second time period to the third destination of the second group,
   wherein the transmission processing unit processes for transmitting the audio data of the first time period to the second destination of the first group after processing for transmitting the audio data of the first time period to the first destination, and the transmission processing unit processes for transmitting the audio data of the second time period to the fourth destination of the second group after processing for transmitting the audio data of the second time period to the third destination.

2. The apparatus according to claim 1, wherein when the number of the plurality of destinations changes, said grouping unit changes grouping of the plurality of destinations.

3. The apparatus according to claim 2, wherein when the number of the plurality of destinations changes, said grouping unit changes positions of the plurality of destinations with respect to the plurality of groups.

4. The apparatus according to claim 2, wherein when the number of the plurality of destinations reaches a predetermined number, said grouping unit increases the number of the plurality of groups.

5. The apparatus according to claim 2, wherein, in a case where said grouping unit changes grouping of the first destination from the first group which has received the first audio data to the second group which has not received the second audio data, said transmission processing unit does not process for transmitting to the first destination a audio data corresponding to a time period overlapped with the first time period in the second audio data.

6. A method of controlling a data transmitting apparatus for transmitting audio data to a plurality of destinations, comprising:
   a grouping step of grouping the plurality of destinations into a plurality of groups including at least a first group and a second group such that first and second destinations belong to the first group and third and fourth destinations belong to the second group; and
   a transmission processing step of processing for transmitting, at a first timing corresponding to generation of audio data of a first time period, the audio data of the first time period to the first destination of the first group, and of processing for transmitting, at a second timing corresponding to generation of audio data of a second time period later than the first time period and overlapped with the first time period, the audio data of the second time period to the third destination of the second group,
   wherein the transmission processing step processes for transmitting the audio data of the first time period to the second destination of the first group after processing for transmitting the audio data of the first time period to the first destination, and the transmission processing step processes for transmitting the audio data of the second time period to the fourth destination of the second group after processing for transmitting the audio data of the second time period to the third destination.

7. The method according to claim 6, wherein the grouping step includes a step of changing, when the number of the plurality of destinations changes, grouping of the plurality of destinations.

8. The method according to claim 7, wherein the grouping step includes a step of changing, when the number of the plurality of destinations changes, positions of the plurality of destinations with respect to the plurality of groups.

9. The method according to claim 7, wherein the grouping step includes a step of increasing, when the number of the plurality of destinations reaches a predetermined number, the number of the plurality of groups.

10. The method according to claim 7, wherein, in a case where the grouping step changes the group of a the first destination from the first group which has received the first audio data into the second group which has not received the second audio data, the transmission processing step does not process for transmitting to the first destination a audio data corresponding to a time period overlapped with the first time period in the second audio data.

11. A non-transitory computer-readable storage medium storing a program that is executable by a computer to implement a method of transmitting audio data to a plurality of destinations may be applied, the program comprising,
   a grouping step of grouping the plurality of destinations into a plurality of groups including at least a first group and a second group such that first and second destinations belong to the first group and third and fourth destinations belong to the second group; and
   a transmission processing step of processing for transmitting, at a first timing corresponding to generation of audio data of a first time period, the audio data of the first time period to the first destination of the first group, and of processing for transmitting, at a second timing corresponding to generation of audio data of a second time period later than the first time period and overlapped with the first time period, the audio data of the second time period to the third destination of the second group, wherein the transmission processing step processes for transmitting the audio data of the first time period to the second destination of the first group after processing for transmitting the audio data of the first time period to the first destination, and the transmission processing step processes for transmitting the audio data of the second time period to the fourth destination of the second group after processing for transmitting the audio data of the second time period to the third destination.

\* \* \* \* \*